(12) United States Patent
Litzenberg et al.

(10) Patent No.: US 10,675,804 B2
(45) Date of Patent: Jun. 9, 2020

(54) METHOD AND APPARATUS FOR PRODUCING LIQUID-CONTENTS-FILLED CONTAINERS FROM PREFORMS BY CONTENTS BEING INTRODUCED INTO THE PREFORM UNDER PRESSURE

(71) Applicant: KHS CORPOPLAST GmbH, Hamburg (DE)

(72) Inventors: Michael Litzenberg, Börnsen (DE); Michael Linke, Hamburg (DE); Frank Berger, Barsbüttel (DE); Benjamin Jaiser, Hamburg (DE)

(73) Assignee: KHS Corpoplast GmbH, Hamburg (DE)

(*) Notice: Subject to any disclaimer, the term of this patent is extended or adjusted under 35 U.S.C. 154(b) by 0 days.

(21) Appl. No.: 16/310,508

(22) PCT Filed: Feb. 3, 2017

(86) PCT No.: PCT/EP2017/000148
§ 371 (c)(1),
(2) Date: Dec. 17, 2018

(87) PCT Pub. No.: WO2018/141347
PCT Pub. Date: Aug. 9, 2018

(65) Prior Publication Data
US 2019/0337216 A1  Nov. 7, 2019

(51) Int. Cl.
*B29C 49/06* (2006.01)
*B29C 49/12* (2006.01)
(Continued)

(52) U.S. Cl.
CPC ............ *B29C 49/06* (2013.01); *B29C 49/12* (2013.01); *B29C 49/36* (2013.01);
(Continued)

(58) Field of Classification Search
CPC ......... B29C 49/06; B29C 49/12; B29C 49/36; B29C 49/42; B29C 49/46; B29C 49/58;
(Continued)

(56) References Cited

U.S. PATENT DOCUMENTS

2008/0029928 A1   2/2008   Andison et al.
2012/0266567 A1   10/2012  Haesendonckx et al.
(Continued)

FOREIGN PATENT DOCUMENTS

CH       388173 A        2/1965
CN       85105455   *    7/1985   ............... B01F 5/12
(Continued)

*Primary Examiner* — Alison L Hindenlang
*Assistant Examiner* — Shibin Liang
(74) *Attorney, Agent, or Firm* — Rankin, Hill & Clark LLP

(57) ABSTRACT

The invention relates to a method and an apparatus for producing liquid-contents-filled containers (22) from preforms (1) by contents being introduced into the preform (1) under a filling pressure, wherein the contents are placed under pressure by a pressure pump (7) and are introduced into the preform (1) at a molding and filling station (3) by a filling valve (6). A pressure accumulator (10) arranged between the pressure pump (7) and the filling valve (6) is subjected to pressure and is filled with a volume of contents by the pressure pump (7). The invention is distinguished in that a displacement pump (26) having a filling chamber (28) for the contents and having a displacement body (30) guided so it is movable therein is provided, wherein the displacement body (30) divides the chamber (28) into a first partial chamber (28a) on the filling station side and a second partial chamber (28b) facing away from the filling station, each of which can be brought into a fluidic connection with the pressure accumulator (10). The displacement body (30) has a drive connection to a drive unit (32) and is drivable by the drive unit (32), wherein when the filling valve (6) is opened,
(Continued)

Figure 1:
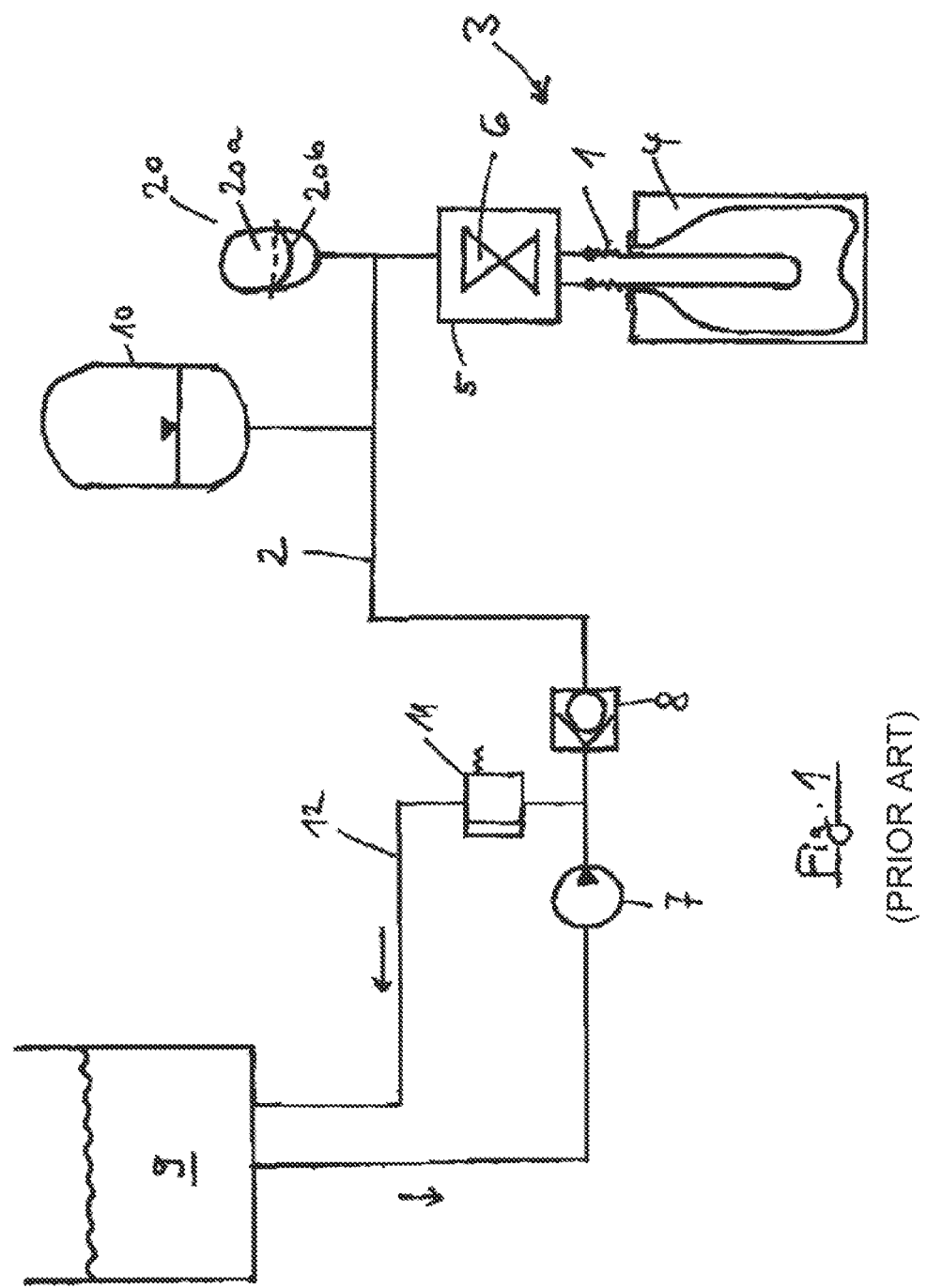

the drive unit (32) and/or the pressure accumulator (10) each at least temporarily apply a drive force to the displacement body (30), and at the same time the displacement body (30) displaces at least a part of the quantity of contents required for the forming of the preform (1) in the direction of the preform (1).

19 Claims, 2 Drawing Sheets

(51) Int. Cl.
  *B29C 49/36* (2006.01)
  *B29C 49/42* (2006.01)
  *B29C 49/46* (2006.01)
  *B29C 49/58* (2006.01)
  *B29K 67/00* (2006.01)
  *B29L 31/00* (2006.01)

(52) U.S. Cl.
  CPC .......... *B29C 49/4289* (2013.01); *B29C 49/46* (2013.01); *B29C 49/58* (2013.01); *B29C 2049/4664* (2013.01); *B29C 2049/5803* (2013.01); *B29K 2067/003* (2013.01); *B29L 2031/7158* (2013.01)

(58) Field of Classification Search
  CPC ........ B29C 49/4289; B29C 2049/4664; B29C 2049/5803; B29C 53/32; B29C 45/00; B65B 3/02; B65B 3/24; B67C 3/20
  See application file for complete search history.

(56) References Cited

U.S. PATENT DOCUMENTS

| | | |
|---|---|---|
| 2013/0328248 A1 | 12/2013 | Herold et al. |
| 2015/0190960 A1* | 7/2015 | Chauvin ............. B29C 49/4289 426/397 |
| 2016/0243747 A1 | 8/2016 | Gillet |
| 2017/0008215 A1 | 1/2017 | Sayama et al. |
| 2017/0158361 A1 | 6/2017 | Desoutter |

FOREIGN PATENT DOCUMENTS

| | | |
|---|---|---|
| DE | 202009006684 U1 | 8/2009 |
| DE | 102010007541 A1 | 6/2011 |
| EP | 2823948 A1 | 1/2015 |
| EP | 2960161 A1 | 12/2015 |
| EP | 3112126 A1 | 1/2017 |
| WO | 2012083910 A1 | 6/2012 |

* cited by examiner

METHOD AND APPARATUS FOR PRODUCING LIQUID-CONTENTS-FILLED CONTAINERS FROM PREFORMS BY CONTENTS BEING INTRODUCED INTO THE PREFORM UNDER PRESSURE

The present invention relates to a method and an apparatus for producing liquid-contents-filled containers from preforms by contents being introduced into the preform under pressure.

A preform is understood in this context as a prefinished blank, for example, made of PET or another thermoplastic, which is produced, for example, in an injection molding method. Such preforms are generally closed at the bottom and have an open orifice region opposite to the bottom, having a thread already formed on the exterior thereon. For example, FIG. 2 of DE 10 2010 007 541 A1 shows such a preform.

Containers, in particular bottles, are conventionally molded in the blow molding method in a blow molding machine by a molding gas flowing under pressure into a thermally conditioned preform and filled in a second step with contents, in particular liquid contents. WO 2012/083910 A1 shows typical prior art for a blow molding machine, and also shows a typical heating line for the thermal conditioning of the preforms, and the typical arrangement of blowing stations on a rotating blowing wheel. Reference can also be made to this prior art with respect to the supply and removal of the preforms and with respect to the handling of the preforms within the blow molding machine. The methods and apparatuses described in the present application can be embodied substantially as described in WO 2012/083910 A1 with respect to the construction thereof, with respect to the preform handling, and with respect to the preform processing. Deviations necessarily result from the circumstance that cited prior art WO 2012/083910 A1 discloses blowing stations and a blowing wheel, which are to be replaced in the present case by molding and filling stations or by an operating wheel, on which multiple molding and filling stations are arranged, respectively. For this reason, reference is explicitly made to the description of WO 2012/083910 A1, to FIGS. 1-12 therein, and to the associated description of the figures. If not otherwise described to the contrary hereafter, the apparatus according to the invention can be embodied in the same manner.

It is characteristic for the production of containers from preforms that different molding tools are used in each case for the preform, on the one hand, and for the container, on the other hand.

Extrusion blowing methods foreign to the species, in which the molten raw material is extruded directly into a blow mold predefining the container contour and is inflated immediately thereafter, are to be differentiated from the production of containers from preforms. Methods for producing and filling containers from a tubular material as a starting point are also to be differentiated therefrom. For example, CH 388 173 shows the latter prior art. An extrusion molding method is also disclosed in this prior art, wherein a thermoplastic material in the form of a tube is extruded here and is shaped directly in an external mold.

Apparatuses and methods, in which the thermally conditioned preform can be molded and filled not by a pressurized gas, but rather by liquid contents supplied under pressure in one step, have already been developed for the more efficient production of containers from preforms. Such a method and such an apparatus are known, for example, from DE 10 2010 007 541 A1.

In order that a preform can be formed into a container, it is thermally conditioned, i.e., in particular heated and provided with a suitable temperature profile. In this case, the body of the preform including the closed bottom is heated, for example, to approximately 120° C. and thus becomes moldable. The orifice region of the preform is generally only brought to a significantly lower temperature in this case, since the preform is handled and held at the orifice region in the molding and filling machine and cannot deform under the holding forces typical therein. Furthermore, a thread is generally also already formed in the orifice region, which is not to be subjected to a further shape change. An apparatus for producing filled containers has a heating line for the thermal conditioning, which is equipped with heating units, along which the preforms are guided and are provided at the same time with the desired temperature profile. Such a heating line can be designed, for example, as shown in WO 2012/083910 A1.

The molding procedure then has to run very rapidly, so that the heat stored in the preform is sufficient to keep the preform plastically deformable until the completion of the molding procedure. In the case of molding using liquid contents, the content volume required for the formed container therefore has to be supplied to the preform under high pressure and within a short time interval. Typical filling times are in the range of 100 to 150 ms, whereby volume flows of up to 20 L/second and more at pressures of up to 40 bar are required.

The beginning of the molding procedure is usually assisted by a stretching rod plunging into the preform, which exerts mechanical pressure on the bottom of the preform in its axial direction in order to stretch the preform. The stretching rod subsequently takes over the guiding of the bottom, so that the container can form symmetrically and the actual stretching of the preform assumes a specific time curve as much as possible. However, methods and apparatuses are also possible which operate without a stretching rod.

A minimum filling pressure dependent on the material and shape of the preform and the container to be produced is required for the forming of the preform into a container, wherein a higher pressure can be advantageous at the beginning of the forming phase to initiate the forming procedure.

In industrial processes, preforms are supplied to the molding and filling station of a machine for producing filled containers and molded and filled in succession. High volume flows are required in this case during the filling time, while no contents flow in the process times between two fillings. The present invention can be applied in this case both to cyclically operating machines and also to machines according to the rotary filling principle. These machines according to the rotary filling principle can have, for example, an operating wheel, which is driven to revolve continuously in regular molding and filling operation. Multiple molding and filling stations are arranged on this operating wheel.

The high volume flows required are only achievable with difficulty using continuously running pumps, particularly because the full output is only required very briefly. Therefore, for example, piston pumps, the stroke volume of which corresponds to the required quantity of contents, are used for the hydraulic molding and filling of containers. The piston is driven using a linear motor, hydraulically, or pneumatically and the contents located in the cylinder of the piston pump are pressed into the preform or into the forming container, respectively. US 2008/0029928 A1 corresponds to such prior art, for example.

The reaction time of a piston pump is long in comparison to the filling time, and therefore in particular at the beginning of a molding and filling procedure, the desired volume flow is not reached and a reproducibly good distribution of the material of the preform cannot be ensured in the molded container.

Moreover, depending on the design of the filling apparatus, multiple containers can also be filled overlapping in time at multiple filling stations. A sufficient supply of contents cannot be ensured using a piston pump of the above-described type. The beginning and the end of successive filling procedures do not run seamlessly and harmonically, and therefore pressure pulses can occur in the distributor system.

It results as a further disadvantage that a drive unit having a high power consumption is required for the drive of the piston of the described piston pumps, in order to provide the required filling pressure and the required quantity of contents in the shortest possible filling time. In molding and filling machines having an operating wheel continuously rotating in regular molding and filling operation, having multiple molding and filling stations arranged thereon, each of the stations is to be provided with such a drive unit, and therefore high costs result.

It is the object of the invention to propose a method and an apparatus for producing liquid-contents-filled containers from preforms by contents being introduced into the preform under pressure, in which both the desired filling pressure and also the desired volume flow of the contents are reliably available during the entire molding and filling phase. In particular, the above-described drive units having high power consumption are to be avoided in this case.

The object according to the invention is achieved by a method for producing liquid-contents-filled containers from preforms as disclosed and claimed herein. According to the invention, in addition to the pressure accumulator according to the species, a displacement pump having a filling chamber for the contents is provided, which has a displacement body guided so it is movable in the filling chamber. Movement of the displacement body results in a displacement of the contents in the filling chamber. The displacement body divides the chamber into a first partial chamber on the filling station side and a second partial chamber facing away from the filling station. As the displacement body shifts, one partial chamber enlarges at the cost of the other partial chamber. Both partial chambers can be brought into a fluidic connection with the pressure accumulator. Contents from the pressure accumulator can be fed into the partial chambers. The displacement body has a drive connection to a drive unit and is drivable by the drive unit. The drive unit can change the position of the displacement body inside the chamber and thus change the size of the partial chambers. It is furthermore provided according to the invention that when the filling valve is open, the drive unit and/or the pressure accumulator each apply a drive force to the displacement body at least sometimes, and in this case the displacement body displaces at least a part of the quantity of contents required for the forming of the preform in the direction of the preform. More exact control and metering of the quantity of contents which is pressed into the preform is thus possible than in the prior art forming the species. The displaced quantity of contents results on the basis of the position shift of the displacement body inside the filling chamber and the controlled shift of the displacement body therefore enables an accurate and reproducible quantity of contents, which flows into the preform within a specific time. Both filling quantity and also filling pressure can be metered more accurately than in the prior art forming the species.

Inter alia, it is possible that the displacement pump and the pressure accumulator each exert a separate drive force on the displacement body at least temporarily, which results in a force superposition. It is conceivable that the pressure accumulator exerts a force in the direction of the filling valve on the displacement body and the drive unit acts in the opposite direction to this force, to prevent an excessively high displacement of contents per unit of time. It is also conceivable that both apply a force oriented in the same direction to the displacement body, for example, both in the direction of the filling valve. A high quantity of contents per unit of time may thus be displaced, without the drive unit having to have large dimensions as in the prior art, because a part of the drive power is provided by the pressure accumulator. The drive unit can also remain without force action on the displacement body if needed. It is also conceivable that solely the drive unit drives the displacement body, while the pressure accumulator remains without force action. This can be preferable, for example, for the charging stroke of the displacement pump, i.e., during movement of the displacement body in the direction facing away from the filling valve. It is also possible to change between these options as needed in the course of the filling and molding process. The above-mentioned options result in that the pressure accumulator can have a flow connection to both partial chambers, and therefore depending on the connection switching, the pressure of the pressure accumulator can be applied alternately to one of the two or to neither of the two or to both sides of the displacement body.

The object according to the invention is also achieved by an apparatus for producing liquid-contents-filled containers from preforms as disclosed and claimed 2 herein. The explanations given in the preceding paragraph on the method claim apply correspondingly to the apparatus.

Both in the method claim and also in the apparatus claim, it is preferable for the displacement body to displace the predominant part of the quantity of contents required for the forming of the preform (>50% of the required quantity of contents), wherein it is particularly preferable for the entire quantity of contents required for the forming to be displaced by the displacement body. In this manner, the quantity of contents fed into the preform is only still related to the movement of the displacement body, specifically to the displaced quantity of contents. This movement is executable exactly and reproducibly. An accurate and reproducible quantity of contents, which flows into the preform within a specific time, is thus settable via the controlled displacement of the displacement body. Both filling quantity and also filling pressure can be metered accurately.

The invention can also be implemented in principle in cyclically operating machines. However, high production numbers may be achieved if multiple molding and filling stations are arranged on a shared, rotating operating wheel, wherein this operating wheel revolves continuously in the regular molding and filling operation of the apparatus. Furthermore, it is preferable both for the method and also for the apparatus for the molding of the container from the preform to be assisted by a stretching rod, which, during the introduction of the contents into the preform, at least temporarily stretches the preform in its axial direction at the same time. Such stretching rods and the design of such stretching rods are known in principle from blow molding machines.

The following explanations and the following preferred embodiments according to the dependent claims apply similarly to the methods and the apparatuses.

The method according to the invention and the apparatus according to the invention have the advantage that the drive unit of the additionally provided displacement pump only has to partially generate the drive force for the displacement of the contents into the filling chamber, because the pressure accumulator can act in assistance on the displacement body. For this reason, the drive unit can be dimensioned smaller than known in the prior an. The method according to the invention and the apparatus according to the invention also have the advantage that a continuously running pump can be used as the pressure pump in order to supply the pressure accumulator with the required pressure. Such pumps can achieve the high pressures required during the forming, but in general not the large volume flow required for the filling. In the process times between two filling procedures, this pump applies contents under pressure to the pressure accumulator, for example, when the filling valve is closed, wherein the pressure accumulator fills with a volume of contents. As soon as the filling valve is opened, this pressure is available and the contents can flow in the direction toward the preform. According to the invention, a displacement pump at least temporarily participates during this molding and filling procedure in conveying the contents in the direction toward the preform.

It is preferable in this case for the displacement pump to be embodied as a reciprocating piston pump, which can also be referred to as a piston pump. Displacement pumps have a filling chamber, which is filled with contents in the present case. A displacement body is guided so it is movable inside the filling chamber. In the case of a reciprocating piston pump, the displacement body is embodied as a piston. The displacement body, or the piston, respectively, divides the filling chamber into two partial chambers. Both chambers can be brought into fluidic connection with the pressure accumulator. The displacement body additionally has a drive connection to the drive unit, and therefore the displacement body can be driven to generate a displacement movement having a displacement force. The fluidic connection to the pressure accumulator has the advantage that the contents can later flow under pressure from the pressure accumulator into the filling chamber, and furthermore a pressure equalization can advantageously take place between the first and the second chamber of the filling chamber, wherein this pressure can be kept at the pressure level of the pressure accumulator as a result of the fluidic connection to the pressure accumulator. After such a pressure equalization, the displacement body can be shifted without the necessity of overcoming a pressure difference between the partial chambers.

The displacement pump or its drive unit, respectively, can be used in particular so that the filling speed can be controlled so as to vary over time during the molding and filling process. For this purpose, the drive unit is embodied as path controlled. This means that the drive energy applied by the drive unit varies over the stroke path of the displacement body. The drive unit can propel the driven displacement body at higher velocity at the beginning of the molding and filling procedure, for example, than at a later point in time of the molding and filling procedure. The path control can also be modified on the control side in this case if the achieved results in the container production make a modification of the parameters of the production process necessary. For this purpose, for example, the drive characteristic of the drive unit could be changed, i.e., the time curve of the drive force on the stroke path of the displacement body. The drive unit can be designed, for example, as a linear motor or as another motor. In particular linear motors may be controlled in a simple manner and precisely, and therefore these linear motors have very good properties, which cause them to appear preferable as the drive unit, in particular as having a drive characteristic which is easy to change. It is also conceivable to embody the drive unit, for example, as a curve controller, wherein it is considered disadvantageous in this case, inter alia, that a change of the drive characteristic would only be possible by replacement of the control curve.

It is furthermore preferable for a fluidic connecting line to lead from the pressure accumulator to both the first and also the second partial chamber. Preferred design variants may be embodied as a result of these separate connecting lines. In particular, for example, the fluidic connecting line to the first partial chamber can be embodied as valve controlled. It is thus possible, for example, by closing the valve arranged in this connecting line, to decouple the first partial chamber from the pressure accumulator and upon opening of the filling valve, to control the quantity of contents flowing into the preform only in dependence on the movement guiding of the displacement body.

In particular if an ability to throttle the fluidic connecting line to the second partial chamber is provided, it is possible to brake the movement of the displacement body at the end of the molding and filling procedure, specifically by constricting the fluidic connecting line and thus throttling the inflow of contents, and therefore the displacement body or the drive unit for this displacement body has to work against the throttled inflow cross section. Toward the end of the filling procedure, the inflow of contents can be throttled more strongly, and thus the displacement body has to operate against a higher pressure and is thus braked. Pressure surges at the end of the filling procedure can be reduced using this embodiment variant.

Furthermore, it is preferable for the flow cross section of the connecting line to the second partial chamber to be dimensioned larger than the flow cross section of the supply line to the preform. In this manner, it is ensured that the flow cross section available for the later flowing of the contents into the filling chamber is dimensioned such that the outflowing volume can be tracked without problems. In conjunction with the ability to throttle the connecting line to the second partial chamber, the later flowing of the contents out of the pressure accumulator into the filling chamber can be influenced and in particular the later flowing can be made more difficult to brake a movement of the displacement body. An equivalent effect can be achieved during the outflow of the contents out of the filling chamber into the preform by an ability to throttle the filling valve.

A continuously running pump can advantageously be used as the pressure pump. Such pumps can achieve the required high pressures, but generally not the large volume flow required for the filling. In the process times between two filling procedures, the pump applies contents under pressure to the pressure accumulator when the filling valve is closed, wherein the pressure accumulator fills with a volume of contents.

A specific minimum pressure is required during a molding and filling procedure to form the preform. Higher pressures can be used and are advantageous in particular in the starting phase of the forming in order to initiate the forming procedure. The beginning of the forming procedure can also be assisted by a stretching rod, however.

A specific maximum pressure should also not be exceeded, on the one hand, because the system components are not designed for this purpose and, on the other hand, because the forming of the preform of the container then does not take place in a controlled manner.

The pressure accumulator used should therefore preferably have a pre-tension pressure, which corresponds to the minimum molding pressure. The pressure of the pressure accumulator rises upon filling with the contents. Depending on the design and volume of the pressure accumulator, the pressure increase can be negligible or substantial. For example, a pre-tension pressure of 36 bar can be used, which rises upon filling with the desired volume of contents to 40 bar, for example. If the pressure achieved in the accumulator is higher than the maximum filling pressure, corresponding pressure regulators are to be provided before the molding and filling station.

The pump has to be able to apply the pressure which is to be achieved in the pressure accumulator. The pump advantageously achieves a pressure corresponding to the maximum filling pressure. If the pump pressure is higher, corresponding means are again to be provided for pressure regulation.

The design described above by way of example has the advantage that the pressure built up in the pressure accumulator is initially high during the molding and filling procedure, whereby the forming of the preform can be initiated more easily. The beginning of the forming can also be facilitated by a stretching rod, for example, in an assisting and guiding manner.

A lower pressure is generally subsequently sufficient to advance forming once it has been initiated. The pressure of the pressure accumulator dropping in the course of the molding and filling procedure is therefore harmless if a specific minimum pressure is maintained.

The pressure provided by the pressure accumulator can be elevated in each case by the displacement pump, which provides an additional pressure. This additional pressure can be provided in particular at the beginning of the molding and filling procedure.

The volume of the pressure accumulator should at least correspond to the volume of the container to be molded and filled, i.e., substantially to the volume of the mold in which the preform is formed into the container. Depending on the use, the volume of the pressure accumulator can also be higher, however, in particular if the method is implemented using a molding and filling apparatus on which containers can be molded and filled at multiple molding and filling stations overlapping in time. This applies similarly to the displacement pump, the filling chamber of which is also to be dimensioned such that the completely displaced volume is sufficiently large for the filling of the finished container.

The pressure accumulator is preferably a gas pressure accumulator, which is pre-tensioned using a pressure which at least corresponds to the molding and filling pressure.

The pump is preferably a continuously running pump. Any other type of pump, using which a sufficient pressure is to be achieved, is also suitable, however. The operating pressure of the pump should preferably at least correspond to the minimum filling pressure, more preferably to the maximum filling pressure. At higher pressures, corresponding pressure regulators are to be provided in the liquid path before the filling valve.

Outside a molding and filling procedure, i.e., in particular when the filling valve is closed, the pump applies contents under pressure to the pressure accumulator. As long as the pressure achieved by the pump is greater than the pressure prevailing in the pressure accumulator, the pump pumps liquid into the pressure accumulator. A volume is stored in the pressure accumulator which preferably at least corresponds to the volume required for a molding and filling procedure, i.e., substantially to the internal volume of the mold in which the preform is formed into the filled container.

If the maximum volume of the pressure accumulator is reached or if the pressure in the pressure accumulator rises to the desired value, the pump thus runs empty or the contents are discharged via a return line having overpressure valve.

For the actual molding and filling procedure, the filling valve is opened. The full molding and filling pressure is immediately available, which has previously been built up in the pressure accumulator. The volume flow required for the molding and filling procedure can be provided by the pressure accumulator independently of the pump output. In addition, the displacement pump can add pump output.

Due to the invention, a pump which can supply a high volume flow no longer has to be used for the apparatus. It is sufficient if the pump provides a sufficiently high pressure and the pump output is sufficiently high to fill the pressure accumulator between two filling procedures. The pump output solely has to correspond to the quantity of contents filled per unit of time. The brief high volume flows are provided by the pressure accumulator, assisted by the displacement pump, which can contribute a filling pressure in a manner changing over time in particular by way of the drive unit.

In one exemplary embodiment of the invention, a damping element can advantageously be arranged in the supply line. In particular a gas pressure accumulator is suitable as the damping element. Such a gas pressure accumulator can be provided with a gas filling, which is sealed off in relation to the supply line by a membrane in the accumulator. A pre-tensioned piston in a cylinder can also be used as the damping element, which can be pre-tensioned, for example, by spring force or gas pressure. If a sudden rise of the pressure occurs at the end of a molding and filling procedure, the gas cushion in the pressure accumulator is compressed and/or the spring is tensioned and the pressure wave forming is damped in this manner.

The pressure accumulator should have a pre-tension pressure or a pre-tension force for this purpose, which corresponds to the maximum filling pressure or is slightly above it. The pressure accumulator is not tensioned at normal filling pressure in this manner and maintains its absorption capacity for the pressure wave at the end of the molding and filling procedure.

It has proven to be advantageous if the pressure accumulator is aligned in relation to the molding and filling station such that the pressure wave propagating in the line system between the molding and filling station and the pressure accumulator is incident perpendicularly on the membrane, i.e., the propagation direction of the pressure wave is perpendicular to the membrane. This is ensured in particular if the membrane of the pressure accumulator is perpendicular to the axis of the preform. Due to the special propagation of waves in thin lines and the reflection on the line walls, however, this effect can also be achieved with corresponding curved lines in another alignment.

For effective damping of the propagating pressure wave and protection of the largest possible regions of the apparatus, it is advantageous to arrange the damping element close to the molding and filling station, in particular close to a molding and filling head of the molding and filling station. It can thus be ensured that the pressure wave can only propagate in a very spatially limited region of the apparatus and is effectively damped. Components of the apparatus located farther away are effectively protected.

Since the pressure surges only displace a very small volume, the damping element can accordingly be designed small. It is sufficient if, for example, a gas pressure accumulator has a maximum liquid absorption capability of less than 500 mL, in particular less than 300 mL, and preferably less than 150 mL.

The pressure surges, which can hardly be determined in the pressure level thereof, can thus be controlled using only a simple element. Facility parts are thus protected against pressure surges, in the case of which safety valves can no longer act.

Figure 2:
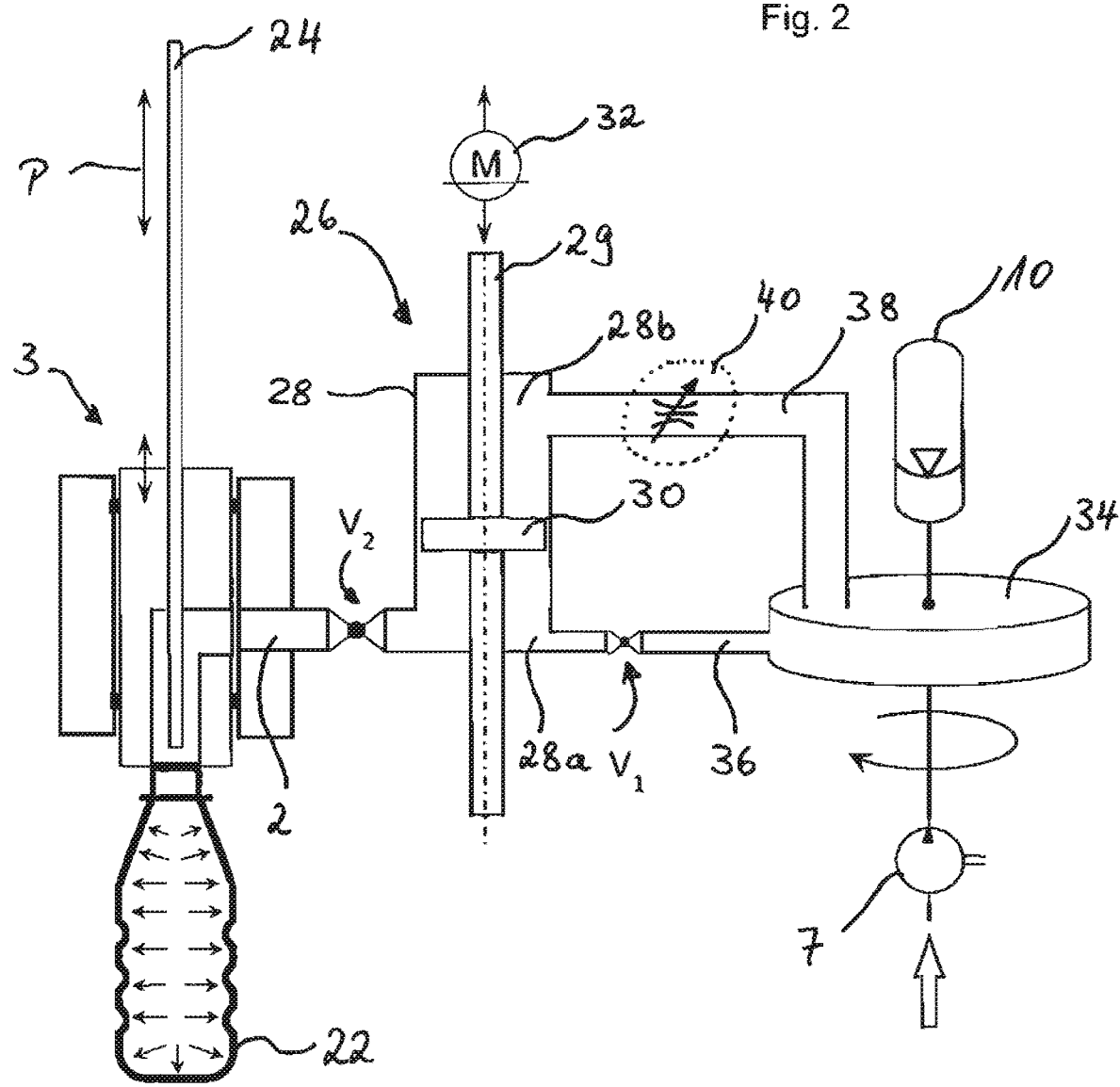

Exemplary embodiments of the invention are schematically illustrated in the following drawings. In the figures:

FIG. 1 shows the schematic construction of a molding and filling apparatus using a pressure accumulator according to the prior art, FIG. 2 shows a schematic illustration of the fundamental construction of an exemplary embodiment of an apparatus according to the invention and a method according to the invention.

It is obvious to a person skilled in the art that the exemplary embodiments illustrated here are merely to be used to illustrate the principle of the invention and the illustrations are only schematic and are not to scale. In particular, the dimensions and size ratios of the elements shown in relation to one another are only to be used for illustration. The actual dimensions and size ratios can be determined freely by a person skilled in the art on the basis of his knowledge in the art. In addition, only the components required for understanding the invention are shown. Real apparatuses can have further components.

The illustrated apparatus has a molding and filling station 3, in which a preform 1 is formed inside a mold 4 into a filled container 22. For this purpose, the molding and filling station 3 has a molding and filling head 5 having a filling valve 6, which is connected to a supply line 2, by which contents can be supplied under pressure to the molding and filling station 3 from a reservoir 9.

For molding and filling a container 22, the molding and filling head 5 is placed on the orifice of the preform 1 to form a seal and contents are supplied to the preform 1 at a pressure of, for example, 36 to 40 bar within the filling time of, for example, at most 150 ms. In the case of a 1.5 L bottle, for example, this requires a volume flow of the contents of at least 10 L/second.

For this purpose, the apparatus is equipped with a pump 7, which runs continuously and reaches a pressure of 40 bar. The supply line 2 is provided with a check valve 8 behind the pump 7.

Furthermore, the apparatus has a pressure accumulator 10 pre-tensioned using a gas. The pressure accumulator 10 is pre-tensioned at 36 bar, for example, and can absorb a volume of, for example, 1.5 L at a pressure of, for example, 40 bar. This volume would be selected as larger, for example, for filling larger containers 22. The running pump 7 places the contents in the supply line 2 under a pressure of 40 bar, and therefore the gas in the pressure accumulator 10 is compressed and the pressure accumulator absorbs 1.5 L of the contents. Upon reaching the pressure of 40 bar, the pressure accumulator 10 does not absorb any further contents. The contents conveyed by the pump 7 are guided via the overpressure valve 11 and the return line 12 back into the reservoir 9.

If the pressure accumulator 10 is completely filled, the filling valve 6 can be opened. The contents stored in the pressure accumulator 10 flow under the initial pressure of 40 bar and with high volume flow through the molding and filling head 5 into the preform 1, which is formed under the action of the contents inside the mold 4 into the container 22 and is filled simultaneously. The pressure in the pressure accumulator 10 drops to 36 bar, which is sufficient for the container forming, up to the complete molding and filling of the container 22.

The pressure accumulator 10 reacts rapidly and without delay and, in contrast to the pump 7, can provide the volume flow required for the short filling time. The container 22 can thus be formed from the thermally conditioned preform 1 before the temperature of the preform 1 drops enough that it is no longer moldable.

After the closing of the molding and filling valve 6, the molded container 22 can be separated from the molding and filling head 5 and further processed, in particular by closing, labeling, etc. The pump 7 runs further continuously and fills the pressure accumulator 10 again for the next molding and filling procedure.

The apparatus according to the invention has the advantage that a simple pump 7 having a typical liter output can be used, since the high volume flow briefly required for the molding and filling procedure can be stored by the pressure accumulator 10 and dispensed as needed.

In an industrial facility, the liter output of the pump 7 has to be designed such that it meets the filling quantity per unit of time. The high required volume flows during the molding and filling phase are achieved, inter alia, by filling and emptying the pressure accumulator 10. The pressure accumulator 10 is to be designed with respect to the volume in this case such that in the case of the molding and filling of the container 22, it can absorb the container volume at the time. In the case of chronologically overlapping molding and filling of multiple containers 22 in different molding and filling stations 3 connected to the pressure accumulator 10, the volume of the pressure accumulator 10 is to be elevated accordingly.

A damping element 20 is optionally connected to the supply line 2. This is a gas pressure accumulator, for example, in which a gas cushion 20a under pressure is enclosed behind a membrane 20b. The gas pressure corresponds in this case to the maximum molding and filling pressure of the apparatus, for example, 38 bar. Depending on the container 22 to be molded, however, the molding and filling pressure used can be different. The pressure of the gas cushion 20a in the pressure accumulator 10 can typically be between 36 and 44 bar, preferably between 40 and 42 bar.

When the preform 1 is formed into a filled container 22 by the introduction of the contents within approximately 100 to 150 ms, a pressure surge occurs at the same time as a result of the high volume flow of the contents, when the container 22 is completely formed and its wall bears on the wall of the form 4. A pressure peak occurs, which propagates in reverse in the facility as a pressure wave. The level of the pressure peak can only be computed with difficulty. The components of the facility are generally only designed for the filling pressure plus a safety margin, however. Continuous pressure surges can damage the components.

The damping element 20 can damp the pressure wave by way of the brief absorption of a small volume of contents. The damping element 20 is arranged for this purpose close to the molding and filling head 5, and therefore the propagation of the pressure wave is limited to a restricted region of the facility and the upstream components are effectively protected.

Pressure does propagate on all sides in the line system but occurring pressure surges propagate at finite speed as a wave. It is therefore advantageous for the damping element 20 to be arranged such that the propagation direction of the wave is approximately perpendicular to the membrane, since the pressure wave is then damped particularly effectively.

Although pressure accumulator 10 and damping element 20 appear structurally similar, substantial differences nonetheless result in detail.

The pressure accumulator 10 is thus always to be selected in particular as larger than the volume of a container 22 to be produced, while the volume of the damping element 20 can be selected as very much smaller than the container volume.

Furthermore, the damping element 20 is preferably arranged close to or is even integrated into the molding and filling head 5, while the pressure accumulator 10 feeds a supply line to the molding and filling head 5 and longer pipe sections between pressure accumulator 10 and molding and filling head 20 are also not problematic.

Finally, machines having multiple molding and filling stations 3 will have one damping element 20 per molding and filling station 3 or per molding and filling head 5, respectively, while multiple or all molding and filling stations 3 can be fed by the same pressure accumulator 10.

FIG. 2 shows an exemplary embodiment according to the invention, which is supplemented with a displacement pump 26 in relation to the exemplary embodiment shown in FIG. 1 but can otherwise have the construction explained with reference to FIG. 1. In addition to the pressure accumulator 10 and the reservoir 9 already described with respect to FIG. 1 and also the pressure pump 7, a second pump unit is shown, which is embodied in the exemplary embodiment shown as a displacement pump 26, namely as a piston pump. A movable piston 30 is guided as a displacement body in a filling chamber 28 of the displacement pump 26.

A drive motor 32 engages as a drive unit on a piston rod 29 protruding axially out of the filling chamber 28. The piston 30 divides the filling chamber 28 into a lower partial chamber 28a and an upper partial chamber 28b. The upper partial chamber 28b is connected via a connecting line 38 having a flow cross section A to the pressure accumulator 10. A throttle 40, as is indicated by means of dashed lines, can be arranged in this connecting line 38.

A valve V1, which controls the connection 36 between the pressure accumulator 10 and the lower part 28a of the filling chamber 10, is arranged in the connecting line 36 to the lower part 28a of the filling chamber 28. In the exemplary embodiment shown, this valve V1 corresponds to the inlet valve of a typical displacement pump, while the valve V2 in the supply line 2 to the molding and filling station 3 corresponds to the outlet valve of a typical displacement pump. The filling valve 6 of FIG. 1 corresponds to the valve V2 in FIG. 2. Although V2 is shown spaced apart from the filling head, it is considered to be preferable if this filling valve V2 or 6 is arranged as close as possible to the outlet of the contents into the preform 1, as is known in the field of fillers, to avoid dripping, dead spaces in the content supply line, and hygienic problems.

If the outlet valve V2 is closed, thus, for example, the same pressure is applied in the lower and in the upper part 28a, 28b of the filling chamber 28 when the valve V1 is open, namely the pressure which prevails in the pressure accumulator 10. In this pressure-equalized state, the piston 30 can be driven by the motor 32, without having to overcome a pressure difference.

For the purpose of molding and filling, valve V2 is opened and valve V1 is closed simultaneously or earlier in time. The piston 30 moves in a conveyance direction solely because of the pressure difference on the preform side of the valve V2 in relation to the region of the valve V2 on the pressure accumulator side, because the pressure in the pressure accumulator 10 is applied via the connecting line 38 in the upper partial chamber 28b, while a pressure reduction occurs in the lower partial chamber 28a of the filling chamber 28, since the valve V2 is open. The piston 30 is thus already driven by the pressure in the pressure accumulator 10 and by the connection shown between the pressure chamber 10 and the displacement pump 26. In addition, a further drive force can be applied by the drive unit 32, which is embodied, for example, as a linear motor, and therefore in this case the drive unit 32 together with the pressure accumulator 10 forms the conveyance pressure of the contents into the preform 1.

If a throttle valve 40 having controllable cross section is arranged in the connecting line 38 to the upper partial chamber 28b of the filling chamber 28, the inflow of contents from the pressure accumulator 10 can be reduced by targeted constriction of the cross section of the connecting line 38 and the piston movement can thus be slowed. The piston movement can also be changed by the drive unit 32, for example, braked. It is also possible to embody the filling valve V2 so it can be throttled. Upon throttling of the inflow of contents into the preform 1 at the end of the filling procedure, braking of the piston 30 also occurs, since it has to work against a pressure which becomes greater.

The drive unit 32 can move the piston 30 with a specific movement profile, for example, i.e., with a higher speed at the beginning, for example, in order to start the molding and filling procedure with a high filling pressure and a high flow volume. After such a starting phase, the speed can then be reduced in order to be braked at the end of the molding and filling procedure to avoid a strong blowback upon reaching the complete formation state of the container 22.

With ending of the molding and filling procedure, the filling valve V2 is closed and the inlet valve V1 is opened. The piston 30 can then be raised again by a motor, wherein a pressure equalization occurs again in both partial chambers 28a, 28b of the piston chamber 28 with opening of the valve V1. No pressure difference in relation to the upper partial chamber 28b is thus to be overcome for the suctioning of the contents into the lower partial chamber 28a, and the motor power to be applied for the suction movement of the piston 30 is therefore low.

In FIG. 2, in contrast to FIG. 1, the molding and filling station 3 is formed having a stretching rod 24, which is movable in the direction of the arrow P, for example, driven by a motor or, for example, driven by an external control curve. At the beginning of the molding and filling process, the stretching rod 24 is moved against the closed end of the preform 1 and upon further movement in this axial direction it stretches the preform 1 in its axial direction. As soon as the preform 1 has reached the desired axial stretching, the stretching rod 24 can be guided back out of the preform 1 or out of the resulting container 22, respectively.

An operating wheel of the molding and filling machine is indicated with reference numeral 34. The basic construction described on the basis of schematic FIGS. 1 and 2 can thus have multiple molding and filling stations 3, which are arranged spaced apart on the circumference on this rotating operating wheel 34. During the regular molding and filling process of the molding and filling machine, the operating wheel 34 revolves continuously and per revolution, each of the molding and filling stations 3 is equipped once with a preform 1, it molds this preform into a container 22 by introducing the contents, and the finished formed and filled container 22 is removed. There is a similarity to the known blowing wheels of a blow molding machine with respect to this functionality, see, for example, WO 2012/083910 A1.

With respect to the arrangement of the pressure pump 7, the pressure accumulator 10, and the displacement pump 26, there are different options in the case of the provision of the molding and filling stations 3 on an operating wheel 34. One possible embodiment is shown in FIG. 2. The pressure pump 7 is arranged in a stationary manner outside the operating wheel 34 in this case and the pumped contents are transferred to the operating wheel 34 via a rotary connection. The reservoir 9 (not shown in FIG. 2), would also be arranged in a stationary manner outside the operating wheel 34. The pressure pump 7 can be arranged to co-rotate on the operating wheel 34, whereby the rotary connection then has to meet lesser requirements with respect to the pressure tightness. This construction variant is thus advantageous.

The pressure accumulator 10 is arranged on the operating wheel 34 and corotating therewith. This pressure accumulator 10 supplies all molding and filling stations 3 on the operating wheel 34 with contents under pressure. It would also be conceivable to provide more than one pressure accumulator 10 on the operating wheel 34, by each of which only an associated part of the molding and filling stations 3 is supplied with contents. A separate pressure accumulator 10 could even be associated with each molding and filling station.

The displacement pump 26 is preferably arranged on the rotating operating wheel 34 and furthermore preferably at a short distance to the associated molding and filling station 3, in order to achieve short line paths between the displacement pump 26 and the molding and filling station 3. In this case, a separate displacement pump 26 is preferably associated with each molding and filling station 3.

With respect to the machine components of FIG. 1 not shown in FIG. 2, thus in particular with respect to the damping element 20, in contrast, a separate damping element 20 is preferably associated with each molding and filling station 3, which would also be arranged on the operating wheel 34 upon implementation of the molding and filling station according to the rotary filling principle.

LIST OF REFERENCE SIGNS 1 preform
2 supply line
3 molding and filling station
4 mold
5 molding and filling head
6 filling valve
7 pressure pump
8 check valve
9 reservoir
10 pressure accumulator
11 overpressure valve
12 return line
20 damping element
20*a* gas cushion
20*b* membrane
22 container
24 stretching rod
26 displacement pump
28 filling chamber
28*a* first partial chamber
28*b* second partial chamber
29 piston rod
30 displacement body
32 drive unit
34 operating wheel
36 connecting line to 28*a*
38 connecting line to 28*b*
40 throttle, controllable
V1 valve
V2 valve, filling valve
P movement direction of stretching rod

The invention claimed is:

1. A method for producing a liquid-contents-filled container from a preform, the method comprising:
introducing liquid contents into the preform under a filling pressure;
wherein the liquid contents are placed under pressure by a pressure pump and are introduced into the preform at a molding and filling station by a filling valve,
wherein a pressure accumulator arranged between the pressure pump and the filling valve is subjected to pressure and is filled with a volume of the liquid contents by the pressure pump,
wherein a displacement pump is provided, said displacement pump having a filling chamber for the liquid contents and a displacement body movably guided in the filling chamber,
wherein the displacement body divides the filling chamber into a first partial chamber and a second partial chamber,
wherein a first connecting line leads from the pressure accumulator to the first partial chamber and a second connecting line leads from the pressure accumulator to the second partial chamber,
wherein the first partial chamber is fluidly connected to the filling valve via a communication path that does not include the pressure accumulator,
wherein the displacement body includes a drive connection to a drive unit, and
wherein, when the filling valve is opened, one or both of the drive unit and the pressure accumulator at least temporarily apply a drive force to the displacement body, and, at the same time, the displacement body displaces at least a part of a quantity of the liquid contents required to produce the liquid-contents-filled container in a direction toward the preform.

2. The method as claimed in claim 1, wherein the displacement body displaces all of the quantity of the liquid contents required to produce the liquid-contents filled container in the direction toward the preform.

3. The method as claimed in claim 1, wherein the molding and filling station is one of multiple molding and filling stations arranged on a shared continuously rotating operating wheel.

4. The method as claimed in claim 1, wherein, simultaneously during the introduction of the liquid contents into the preform, a stretching rod at least partially stretches the preform in an axial direction of the preform.

5. The method as claimed in claim 1, wherein the displacement pump is a reciprocating piston pump.

6. The method as claimed in claim 1, wherein a pressure equalization takes place between the first partial chamber and the second partial chamber before the filling valve is opened.

7. The method as claimed in claim 1, wherein the drive unit is a path controlled drive unit.

8. The method as claimed in claim 1, wherein either one or both of the first connecting line is valve controlled and the second connecting line is throttleable.

9. The method as claimed in claim 8, wherein the first connecting line is closed before the filling valve is opened, or the first connecting line is closed simultaneously as the filling valve is opened.

10. The method as claimed in claim 1, wherein a flow cross section of the second connecting line is larger than a flow cross section of a supply line from the first partial chamber to the preform.

11. An apparatus for producing a liquid-contents-filled container from a preform by introducing liquid contents into the preform inside a mold under pressure in a molding and filling station, the apparatus comprising:
- a pressure pump;
- a pressure accumulator;
- a displacement pump; and
- a filling valve;
- wherein the pressure pump and the filling valve are fluidly connected to one another, at least in part, by a supply line,
- wherein the pressure accumulator is arranged in the supply line between the pressure pump and the filling valve,
- wherein the displacement pump includes a filling chamber for the liquid contents,
- wherein a movably guided displacement body is provided in the filling chamber,
- wherein the displacement body divides the filling chamber into a first partial chamber and a second partial chamber,
- wherein a first connecting line leads from the pressure accumulator to the first partial chamber,
- wherein a second connecting line leads from the pressure accumulator to the second partial chamber,
- wherein the first partial chamber is fluidly connected to the filling valve via a communication path that does not include the pressure accumulator,
- wherein the displacement body includes a drive connection to a drive unit,
- wherein the apparatus is configured such that when the filling valve is opened, the displacement body is subjected at least temporarily by one or both of the drive unit and the pressure accumulator to a drive force that moves the displacement body within the filling chamber such that the displacement body displaces at least a part of a quantity of liquid contents required produce the liquid-contents-filled container in a direction toward the preform.

12. The apparatus as claimed in claim 11, wherein the displacement body displaces all of the quantity of liquid contents required to produce the liquid-contents-filled container in the direction toward the preform.

13. The apparatus as claimed in claim 11, wherein the molding and filling station is one of multiple molding and filling stations arranged on a shared, continuously rotating operating wheel, and wherein one or both of the displacement pump and the pressure pump is also arranged on the operating wheel.

14. The apparatus as claimed in claim 11, wherein the molding and filling station has a stretching rod, which, simultaneously during the introduction of the liquid contents into the preform, at least temporarily stretches the preform in an axial direction of the preform.

15. The apparatus as claimed in claim 11, wherein the displacement pump is a reciprocating piston pump.

16. The apparatus as claimed in claim 11, wherein the first partial chamber and the second partial chamber are connectable to one another for pressure equalization before the filling valve is opened.

17. The apparatus as claimed in claim 11, wherein the drive unit is a path controlled drive unit.

18. The apparatus as claimed in claim 11, wherein one or both of the first connecting line is valve controlled and the second connecting line is throttleable.

19. The apparatus as claimed in claim 18, wherein a flow cross section of the second connecting line is larger than a flow cross section of the supply line to the preform.

* * * * *